Patented Dec. 9, 1924.

1,518,829

UNITED STATES PATENT OFFICE.

EDWIN B. THORNHILL AND HECTOR G. S. ANDERSON, OF HURLEY, NEW MEXICO, ASSIGNORS TO THORNHILL-ANDERSON COMPANY, OF MUSKOGEE, OKLAHOMA, A CORPORATION OF OKLAHOMA.

PROCESS FOR RECOVERING COPPER FROM ORES THEREOF.

No Drawing.   Application filed November 8, 1922. Serial No. 599,431.

*To all whom it may concern:*

Be it known that we, EDWIN B. THORNHILL and HECTOR G. S. ANDERSON, citizens of the United States, residing at Hurley, county of Grant, and State of New Mexico, have invented a new and useful Process for Recovering Copper from Ores Thereof, of which the following is a specification.

This invention relates to concentration or recovery of copper from ores containing copper sulfides and also containing oxidized copper minerals, (oxides, carbonates or silicates). In such cases it has been proposed to recover the copper by treating a pulp containing the finely divided ore and water, with acid in sufficient amount to dissolve the oxidized copper, then precipitating the dissolved copper by a suitable reducing agent, such as sponge iron and then subjecting the pulp to flotation to recover both the precipitated copper and the sulfide copper minerals present. It has been found that such flotation operation is most advantageously carried out in neutral solution, since, compared to floating the same pulp in an acid or an alkaline solution, the neutral pulp permits a much better recovery of not only the precipitated metallic copper, but also of the sulfide copper. A neutral pulp can be obtained by neutralizing the excess acid by any suitable compound, for example, an alkali or a carbonate. However, in the case of an alkali, if more than the exact amount necessary to neutralize is added, an alkaline condition of the pulp results, which, as stated above, is not conducive to the best subsequent flotation results. If water soluble carbonates are used to neutralize the pulp, a gradual increase in soluble constituents in the mill water will ensue, with its ultimate saturating of the mill waters, particularly where the mill water is circulated, and consequent detrimental effects. Ordinary water soluble carbonates, and also alkalies, are comparatively expensive, therefore, for the purpose of obtaining neutral pulp it is desirable and decidedly preferable to use limestone or dolomite.

For the purpose of neutralization, it is, then, preferable to use limestone, on account of its general utility and cheapness, and because any excess used would be of no detrimental effect to subsequent operations, therefore less skill of the operator is required.

Another beneficial effect which the excess of limestone provides, is the precipitation of ferric salts which have been oxidized from the ferrous state in the process of agitation. As is well known, ferric salts are very efficient solvents of metallic copper. This precipitation of ferric salts prevents the resolution of copper after precipitation by sponge iron.

Our process may be carried out as follows: the pulp consisting of ore (containing both oxidized and sulfide constituents), ground to suitable fineness, together with water, agitated in any suitable apparatus with sufficient sulfuric acid to dissolve the oxidized copper, or so much of same as it may be economically pacticable to dissolve. The pulp is then agitated, or otherwise brought into contact, with sponge iron in sufficient amount to precipitate the dissolved copper in metallic form. It is generally necessary, in order to produce sufficiently rapid solution of the copper to use such amount of acid that the resulting pulp, after solution and precipitation is completed, contains residual acid. This residual acid is neutralized by addition of ground or finely divided limestone or dolomite, or alkaline earth carbonate, in at least sufficient quantity to neutralize the pulp. The pulp containing the precipitated copper, together with undissolved sulfide copper is then subjected to flotation by agitation or aeration, in any suitable apparatus and with any suitable flotation oils or agents, to effect the concentration and recovery of both the precipitated metallic copper and the sulfide copper minerals present in the pulp.

What we claim is—

1. The process of recovering copper from ores containing both oxidized and sulfide constituents which consists in treating a pulp containing such ores with acid to dissolve oxidized copper, precipitating the dissolved copper in metallic form by a reducing agent, neutralizing the pulp by addition of an alkaline earth carbonate and then subjecting the pulp to flotation to recover the precipitated copper together with sulfide copper in the ore.

2. The process of recovering copper from ores containing both oxidized and sulfide constituents which consists in treating a pulp containing such ores with acid to dissolve oxidized copper, precipitating the dissolved copper in metallic form by a reducing agent, neutralizing the pulp by addition of finely divided limestone or dolomite and then subjecting the pulp to flotation to recover the precipitated copper together with sulfide copper in the ore.

In testimony whereof we have hereunto subscribed our names this twenty-seventh day of October, 1922.

EDWIN B. THORNHILL.
HECTOR G. S. ANDERSON